Oct. 8, 1929.  C. GOSSMAN  1,730,502
BUMPER
Filed Jan. 12, 1929
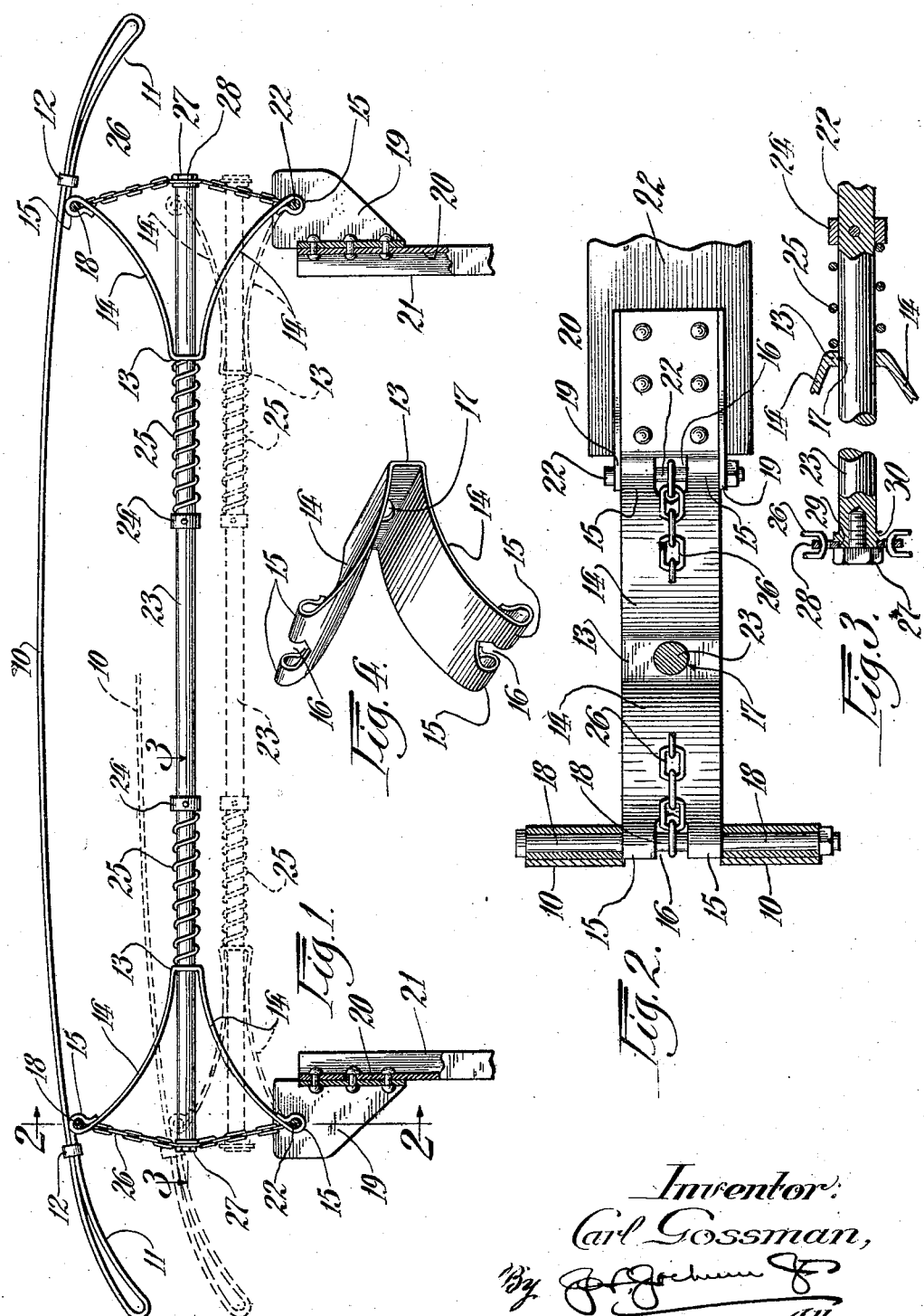
Inventor:
Carl Gossman,
By
Attorney.

Patented Oct. 8, 1929

1,730,502

UNITED STATES PATENT OFFICE

CARL GOSSMAN, OF GLENWOOD, ILLINOIS

BUMPER

Application filed January 12, 1929. Serial No. 332,213.

This invention relates to improvements in bumpers, particularly adapted, though not necessarily limited in its use, to connection with automobiles, and one of the objects of the same is to provide a bumper of this character embodying improved resiliently yielding means to transmit the impact of shocks from external objects to the frame and in whatever direction the impact is received by the bumper bar.

A further object is to provide improved means for limiting the outward movement tendency of the bumper with respect to the vehicle frame and improved means for holding or maintaining the parts against rattling.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a top plan view of a bumper of this character constructed in accordance with the principles of this invention, showing the same attached to a vehicle frame and with a portion of the vehicle frame broken away, the bumper being shown in one position in full lines and in another position in dotted lines.

Figure 2 is a detail sectional view taken on line 2—2, Figure 1, on an enlarged scale.

Figure 3 is a detail sectional view taken on line 3—3, Figure 1, with parts omitted and partly broken away.

Figure 4 is a detail perspective view of one of the pads or members forming a connection between the bumper bar and vehicle.

Referring more particularly to the drawing the numeral 10 designates generally an impact bar which may be of any desired size and configuration and constructed of any suitable material. The bar is preferably bowed as shown to impart rigidity thereto. The ends of the bar are preferably bent back upon themselves as at 11, the bent back portion being secured to the bar preferably by means of clips or fastening devices 12 and the extremeties of the bar are shaped to form eyes or loops.

The numeral 13 designates generally the body portion of a pad or member by means of which the bar is connected to the vehicle, two of which are preferably employed, each of which consists of a body portion having resiliently yielding arms 14 diverging therefrom and formed integral therewith. The extremities of these arms are shaped to form eyes or loops 15 preferably spaced from each other as at 16. The body portion 13 is provided with an opening 17 therethrough.

The eyes 15 on one of the arms 14 of each of the members 13 register with the respective eyes or loops in the extremities of the portions 11 and a fastening pin 18 passes through the registering eyes for connecting the member to the bumper bar. The eyes 15 at the extremity of the other arm 14 register with eyes or loops 19 in a clip or support 20, which latter is secured to the vehicle frame 21. A fastening pin 22 passes through the registering eyes for pivotally connecting the respective members to the vehicle frame.

Passing through the openings 17 in the respective body portions 13 is a bar or rod 23 and secured thereto are collars 24 respectively spaced from the portions 13 of the said members and interposed between the respective collars 24 and the said members are springs 25, so that when the impact is made upon the bar 10 to force the latter towards the vehicle frame, the arms 14 of the respective members will yield to permit such movement and the inward movement of the bumper bar 10 will be yieldingly resisted by means of the springs 25 as the tendency of the body portion of the members is to move toward the respective collars 24 and thereby compress the springs 25.

Any suitable means may be provided for limiting the separating movement of the arms 14 or the movement of the bumper 10 from the vehicle frame, but preferably a flexible member 26 is employed, preferably in the form of a chain having links at its end, the respective links entering the spaces 16 between the eyes at the ends of the arms 14 so that the respective pins 18 and 22 will pass through the links of the flexible member. This flexible member is of such a length that the arms 14 will be normally maintained under tension so that the flexible member 26 will be held taut and thereby prevented from rattling.

The ends of the bars 23 project for a considerable distance through the opening 17 in the body portion 13 of the members and terminate adjacent the respective flexible members 26. A fastening device 27 is provided which passes through the flexible member 26 and engages the proximate end of the bar 23 for securing the end of the bar 23 to the flexible member, the flexible members tending to hold the bar 23 in position and the fastening devices 27 operating to prevent longitudinal displacement of the bar.

Thus it will be seen that no matter in what position or at what angle the impact is made upon the bar 10, the arms 14 of the respective members will be forced towards each other and at the same time the members will be moved longitudinally of the bar 23 so as to compress the springs 25, the springs thereby forming cushioning means for yieldingly resisting the movement of the bumper bar toward the vehicle frame.

If desired, the flexible member 26 may be provided with a member 28 intermediate its length which is provided with an opening adapted to receive a reduced and shouldered portion 29 of the member 23, the head of the fastening device or bolt 27 co-operating with the shoulder 30 formed by the reduced portion 29 of the bar to clamp the member 28 in position.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A bumper for vehicles including an impact bar extending in a general direction across the vehicle, a pair of members each embodying a body portion and a pair of resiliently yielding arms diverging from said body portion, means pivotally connecting the free ends of the arms of the respective members respectively to the bumper bar and the vehicle frame, whereby an impact upon the bumper bar will cause the body portions of said members to be moved towards each other, and means for yieldingly resisting the last said movement of said members.

2. A bumper for vehicles including an impact bar extending in a general direction across the vehicle, a pair of members each embodying a body portion and a pair of resiliently yielding arms diverging from said body portion, means pivotally connecting the free ends of the arms of the respective members respectively to the bumper bar and the vehicle frame, whereby an impact upon the bumper bar will cause the body portions of said members to be moved towards each other, means for yieldingly resisting the last said movement of said members, and means for limiting the separating movement of said arms.

3. A bumper for vehicles including an impact bar extending in a general direction across the vehicle, a pair of members each embodying a body portion and a pair of resiliently yielding arms diverging from said body portion, means pivotally connecting the free ends of the arms of the respective members respectively to the bumper bar and the vehicle frame, whereby an impact upon the bumper bar will cause the body portions of said members to be moved towards each other, means for yieldingly resisting the last said movement of said members, and means for limiting the separating movement of said arms, the last recited means maintaining said arms under tension.

4. A bumper for vehicles including an impact bar extending in a general direction across the vehicle, a pair of members each embodying a body portion and a pair of resiliently yielding arms diverging from said body portion, means pivotally connecting the free ends of the arms of the respective members respectively to the bumper bar and the vehicle frame, whereby an impact upon the bumper bar will cause the body portions of said members to be moved towards each other, means for yieldingly resisting the last said movement of said members, and flexible means connecting the arms of the respective pairs for limiting their separating movements, said arms maintaining said flexible members taut.

5. A bumper for vehicles including an impact bar extending in a general direction across the vehicle, a pair of members each embodying a body portion and a pair of resiliently yielding arms diverging therefrom, means pivotally connecting the ends of the arms respectively to the bumper and the vehicle frame, whereby an impact upon the bumper bar will force the free ends of the arms of the respective pairs towards each other and the said body portions of said members towards each other, a bar loosely connecting the said body portions of the members, and resilient means carried by said bar and operable upon the said body portions to yieldingly resist their movement toward each other.

6. A bumper for vehicles including an impact bar extending in a general direction across the vehicle, a pair of members each embodying a body portion and a pair of resiliently yielding arms diverging therefrom, means pivotally connecting the ends of the arms respectively to the bumper and the vehicle frame, whereby an impact upon the bumper bar will force the free ends of the arms of the respective pairs towards each other and the said body portions of said members towards each other, a bar loosely connecting the said body portions of the members, resilient means carried by said bar and operable upon the said body portions to yieldingly resist their movement towards each other, and flexible means connected with the arms of the respective pairs and extending across the space therebetween for limiting the separating movement of said arms.

7. A bumper for vehicles including an impact bar extending in a general direction across the vehicle, a pair of members each embodying a body portion and a pair of resiliently yielding arms diverging therefrom, means pivotally connecting the ends of the arms respectively to the bumper and the vehicle frame, whereby an impact upon the bumper bar will force the free ends of the arms of the respective pairs towards each other and the said body portions of said members towards each other, a bar loosely connecting the said body portions of the members, resilient means carried by said bar and operable upon the said body portions to yieldingly resist their movement towards each other, and flexible means connected with the arms of the respective pairs and extending across the space therebetween for limiting the separating movement of said arms and to which flexible means the respective ends of the last said bar are connected.

8. A bumper embodying an impact bar extending in a general direction across the vehicle, a pair of pads each embodying a body portion and a pair of diverging and resiliently yielding arms integral therewith, means pivotally connecting the arms of each pair respectively with said bumper bar and the vehicle frame, resiliently yielding means for resisting the movement of said pads towards each other, and means for limiting the separating movement of the arms of the respective pairs.

9. A bumper embodying an impact bar extending in a general direction across the vehicle, a pair of pads each embodying a body portion and a pair of diverging and resiliently yielding arms integral therewith, means pivotally connecting the arms of each pair respectively with said bumper bar and the vehicle frame, resiliently yielding means for resisting the movement of said pads towards each other, and means for limiting the separating movement of the arms of the respective pairs, the last recited means being flexible and operating to maintain said pairs of arms under tension.

10. A bumper embodying an impact bar extending in a general direction across the vehicle, a pair of pads each embodying a body portion and a pair of diverging and resiliently yielding arms integral therewith, means pivotally connecting the arms of each pair respectively with said bumper bar and the vehicle frame, a bar loosely passing through the body portions of said pads, means carried by said bar for yieldingly resisting the movement of said pads toward each other, and flexible means connected with the arms of the respective pairs for limiting their separating movement and for maintaining said arms under tension and to which flexible means the proximate ends of the second recited bar are connected.

In testimony whereof I have signed my name to this specification, on this 9th day of January, A. D., 1929.

CARL GOSSMAN.